United States Patent
Teal et al.

(10) Patent No.: US 10,414,459 B2
(45) Date of Patent: Sep. 17, 2019

(54) STOWABLE STEERING COLUMN FOR CYCLE AND METHOD OF USE

(71) Applicant: PT Motion Works, Inc., Solana Beach, CA (US)

(72) Inventors: Brent C. Teal, Solana Beach, CA (US); David James Bennett, Encinitas, CA (US)

(73) Assignee: PT MOTION WORKS, INC., Solana Beach, CA (US)

( * ) Notice: Subject to any disclaimer, the term of this patent is extended or adjusted under 35 U.S.C. 154(b) by 142 days.

(21) Appl. No.: 15/693,227

(22) Filed: Aug. 31, 2017

(65) Prior Publication Data

US 2018/0065706 A1   Mar. 8, 2018

Related U.S. Application Data

(60) Provisional application No. 62/383,303, filed on Sep. 2, 2016.

(51) Int. Cl.
 *B62K 21/16* (2006.01)
 *B62M 1/26* (2013.01)
 (Continued)

(52) U.S. Cl.
 CPC .............. *B62K 21/16* (2013.01); *B62K 3/002* (2013.01); *B62K 3/10* (2013.01); *B62K 15/00* (2013.01);
 (Continued)

(58) Field of Classification Search
 CPC ........ B62K 15/00; B62K 19/32; B62K 21/16; B62K 21/22; B62K 21/24
 See application file for complete search history.

(56) References Cited

U.S. PATENT DOCUMENTS

| | | | | |
|---|---|---|---|---|
| 6,282,981 B1 * | 9/2001 | Tsai | ....................... | B62K 3/002 |
| | | | | 280/87.041 |
| 7,614,631 B2 * | 11/2009 | Chao | ..................... | B62K 15/00 |
| | | | | 280/278 |

(Continued)

OTHER PUBLICATIONS

Telescoping Steering Column Scooters [online], [search on Dec. 8, 2017], Internet <URL: https://www.google.com/search?q=telescoping+steering+columnscooters&source=lnms&tbm=isch&sa=X&ved=0ahUKEwiUu_vxm_vXAhULHGMKHZYTAfYQ_AUICygC&biw=1920&bih=956> in 1 page.

*Primary Examiner* — Kevin Hurley
(74) *Attorney, Agent, or Firm* — Procopio Cory Hargreaves and Savitch LLP

(57) ABSTRACT

A stowable steering column for a vehicle comprising a fork steerer tube including a fork; a base coupled to the fork steerer tube; a steering tube slidably received within the base and the fork steerer tube, the steering tube including an upper terminal end and a lower portion; a handlebar assembly coupled to the upper terminal end of the steering tube. The maximum effective length of the steering tube is greater than the effective length of the fork steerer tube and base and the steering tube is slidable into different axial positions relative to the base and fork steerer tube to facilitate different handle bar heights for riding and the steering tube is slidable downwards so that the handlebar assembly approaches the base and substantially all of the steering tube is stowed within or below the fork steerer tube for at least one of transport and storage.

9 Claims, 9 Drawing Sheets

(51) Int. Cl.
*B62K 3/00* (2006.01)
*B62K 3/10* (2006.01)
*B62K 15/00* (2006.01)
*B62K 19/32* (2006.01)
*B62K 21/12* (2006.01)
*B62K 21/24* (2006.01)
*B62K 21/02* (2006.01)

(52) U.S. Cl.
CPC .............. *B62K 19/32* (2013.01); *B62K 21/12* (2013.01); *B62K 21/24* (2013.01); *B62M 1/26* (2013.01); *B62K 21/02* (2013.01)

(56) References Cited

U.S. PATENT DOCUMENTS 7,717,446 B2    5/2010  Pate et al.
9,051,021 B2 *  6/2015  Bettin .................. B62K 15/008

* cited by examiner

SECTION A-A

DETAIL B

SECTION C-C

DETAIL D

SECTION E-E

SECTION F-F

SECTION G-G

DETAIL H

SECTION I-I

SECTION J-J

DETAIL K

SECTION L-L

SECTION N-N

US 10,414,459 B2

STOWABLE STEERING COLUMN FOR CYCLE AND METHOD OF USE

CROSS REFERENCE TO RELATED APPLICATION

This application claims the benefit of U.S. Provisional Patent Application No. 62/383,303, filed Sep. 2, 2016, which is incorporated by reference herein.

BACKGROUND

Field of the Invention

The present invention relates generally to cycles and similar vehicles, more particularly to stowable steering columns for cycles and similar vehicles, and even more particularly to stowable steering columns for elliptical cycles.

Related Art

Stowable steering columns aid in the portability and storability of a variety of vehicles. Many different versions of stowable steering columns are known in the art. Most of these systems involve steering columns that fold or can be easily removed to facilitate storing or transporting a vehicle. Implementation of stowable steering columns can be particularly problematic on elliptical cycles, stand-up cycles, scooters and other vehicles that require especially long steering columns. Folding steering columns on these vehicles can get complex and costly in order to both safely withstand the stresses that a standing rider can generate and provide a quick and easy means to fold the steering column. Folding steering columns on these vehicles can be cumbersome for the user to handle because they can swing around like a tiller on a boat unless secured. Removable steering columns can be simpler and cheaper to implement than folding steering columns; however, transporting a vehicle with the steering column removed can be difficult for the user.

SUMMARY

An aspect of the invention involves a stowable steering column for a vehicle that can pass through the steering tube of a front fork into a storage position or telescopically collapse inside the steering tube of the front fork into a storage position. The invention could be implemented on a variety of vehicles, including elliptical cycles, conventional pedal and crank bicycles, stand-up cycles, recumbent bicycles, folding bicycles, electric bicycles, adult scooters, kids scooters, electric scooters, human-powered vehicles, pedal-driven watercraft, or any number of similar vehicles for the purpose of making it easier to transport or store the vehicle. This system can be simpler, cheaper or more convenient and secure than other folding and detachable steering columns known in the art.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1A:
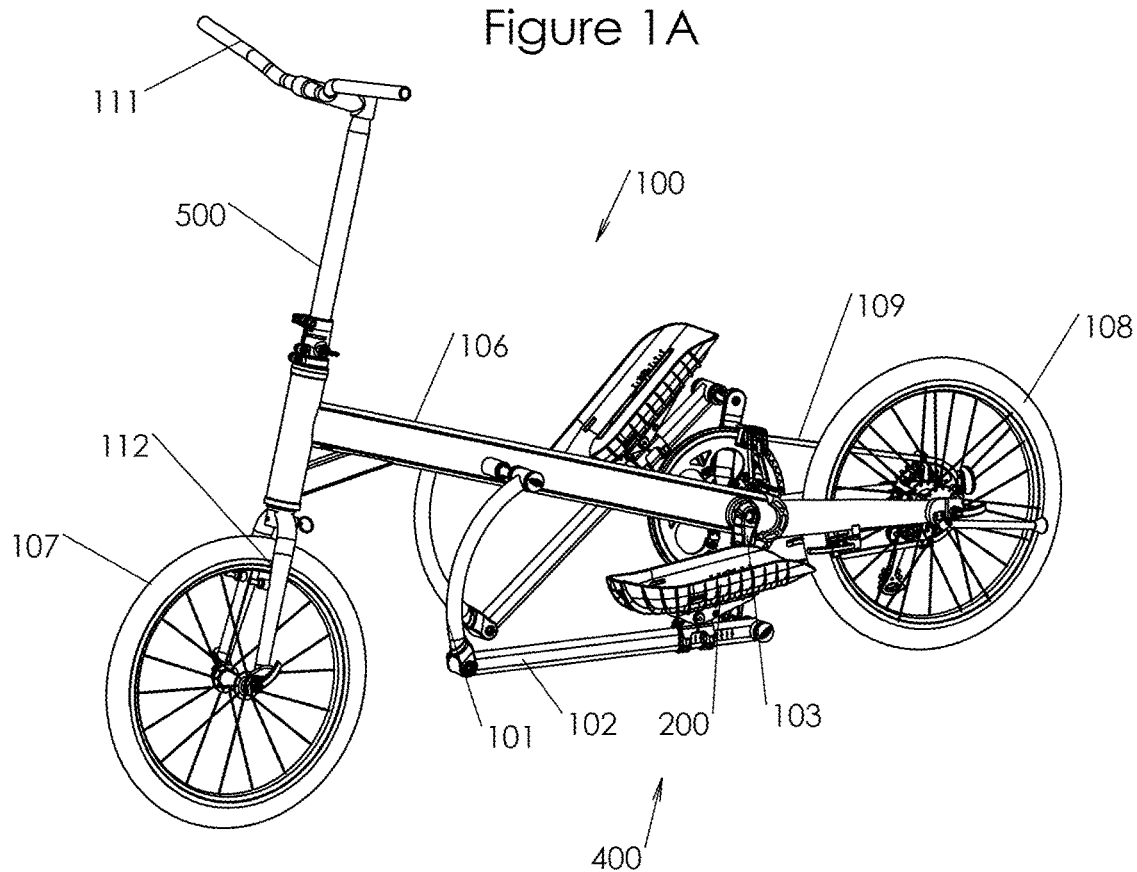
FIG. 1A is a perspective view of an embodiment of an elliptical cycle including a stowable steering column which shows the steering column in a riding position.
Figure 1B:
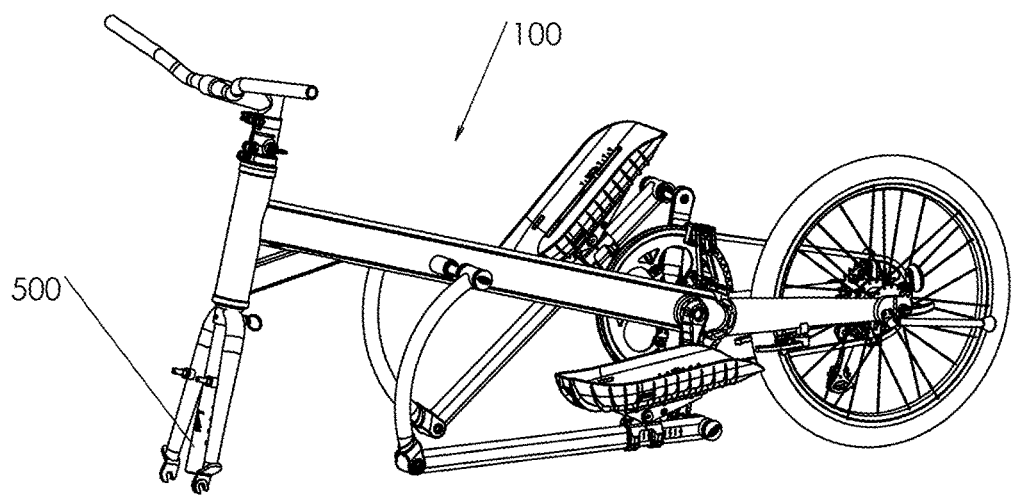
FIG. 1B is a perspective view of the elliptical cycle of FIG. 1A which shows the steering column in a stowed position.

FIGS. 1A & 1B depict one embodiment of a stowable steering column 500 employed on an elliptical cycle 100. FIG. 1A shows the stowable steering column 500 in a riding position. FIG. 1B shows the stowable steering column 500 in the stowed position. Although the stowable steering column 500 in this description will be shown and described with respect to an elliptical cycle 100, in alternative applications, the stowable steering column 500 can be used with other types of vehicles including conventional pedal and crank bicycles, stand-up cycles, recumbent bicycles, folding bicycles, electric bicycles, adult scooters, kids scooters, electric scooters, human-powered vehicles, pedal-driven watercraft, or similar vehicles that would be improved by being able to stow a steering column. Before describing the stowable column 500 in detail, an elliptical cycle 100 will first be described.

An elliptical cycle 100 generally includes a drive mechanism 400 mounted on a frame 106 on which one or more wheels (front wheel 107, rear wheel 108) are mounted. Generally, the drive mechanism 400 comprises either a slider-crank mechanism or a rocker crank mechanism. A drive mechanism 400 comprised of a rocker crank mechanism is depicted in FIG. 1A. In this embodiment, the rocker crank mechanism is comprised of a rocker arm 101 pivotally coupled to the frame 106, a drive arm 102 pivotally coupled to the rocker arm 101 and to a crank arm 103, and a foot platform assembly 200 attached to the drive arm 102.

An alternative embodiment of an elliptical cycle 100 employs a drive mechanism 400 comprised of a slider-crank mechanism. A slider-crank mechanism is comprised of a drive arm 102 movably coupled at its forward end to guide tracks coupled to, or integral with, the frame 106 and pivotally coupled at its rear end to a crank arm 103, a foot platform assembly 200 attached to the drive arm 102. Such an embodiment can be seen in FIG. 1 of Applicant's U.S. Pat. No. 7,717,446, which is incorporated herein by reference.

The front of the elliptical cycle includes the fork 112 rotatably mounted to the frame 106 and connected to the front wheel 107 and stowable steering column 500 which is connected to the handlebars 111. This configuration allows the operator to steer the elliptical cycle 100.

The power transmission 109 connects the drive mechanism 400 to the rear wheel 108. During pedaling, the operator (not shown) uses his mass in a generally downward and rearward motion as in walking or jogging to exert a force on the foot platform assembly 200 and thereby, the drive arms 102. This force causes the rocker arm 101 to swing forward and then backward in an arc and the crank arms 103 to rotate in a circle. Through the power transmission 109 rotating the crank arms 103 causes the rear wheel 108 to rotate, providing propulsive power to the elliptical cycle.

In an alternative embodiment where the drive mechanism is a slider-crank mechanism, the pedaling process exerts a force on the foot platform assembly 200 and thereby, the drive arms 102, causing the drive arms to slide downward and rearward along the guide tracks and the crank arms 103 to rotate in a circle. Through the power transmission 109 rotating the crank arms 103 causes the rear wheel 108 to rotate, providing propulsive power to the elliptical cycle.

The power transmission 109 can be achieved by a number of mechanisms known in the art, including, without limitation, a chain and sprocket, a belt and timing gear, a drive shaft mechanism, or an electro-mechanical generator/motor drive. The elliptical cycle 100 can employ a "fixed" or "free" rear wheel 108, as is known in the art. The elliptical cycle 100 can also employ a planetary gear hub or derailleur system having different gear ratios, as is known in the art.

Pedaling the elliptical cycle 100 as described above results in the operator's foot traveling in a shape that can be described as generally elliptical or ovate. Propulsion using an elliptical or ovate pedaling motion, as opposed to an up-and-down pedaling motion or a circular pedaling motion, has the advantage of better emulating a natural human running or walking motion. Further, an elliptical or ovate pedaling motion is a simpler and a more efficient means to power a cycle than is, for example, a vertical pumping motion. Moreover, the major axis of the ellipse in an elliptical or ovate pedaling motion can be much longer than the stroke length of a circular or vertical pumping pedaling motion, allowing the operator to employ a larger number of muscle groups over a longer range of motion during the pedal stroke than he or she could employ in a circular or up and down pedaling motion.

Figure 2A:
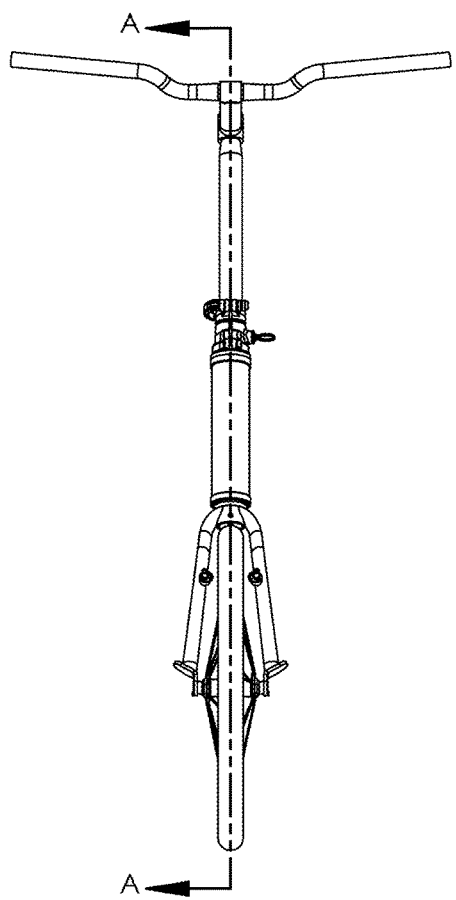
FIG. 2A is a front elevation view of another embodiment of a stowable steering column which shows the steering column in a riding position.
Figure 2B:
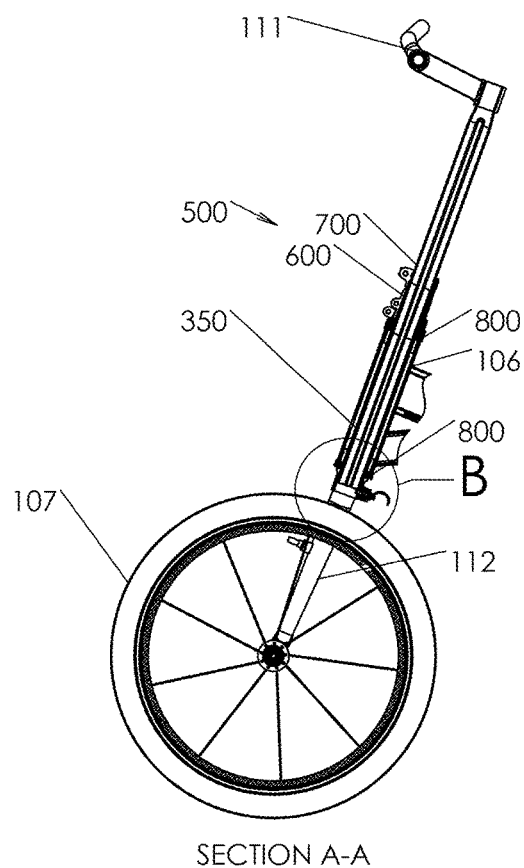
FIG. 2B is a section view of the steering column of FIG. 2A taken along line A-A.
Figure 2C:
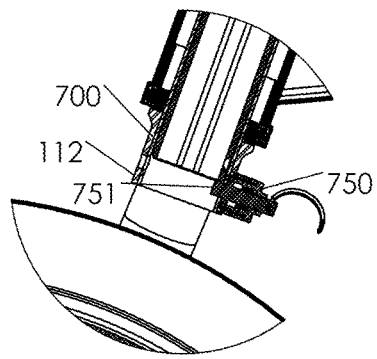
FIG. 2C is a detail view of area B on the steering column of FIG. 2B.
Figure 2D:
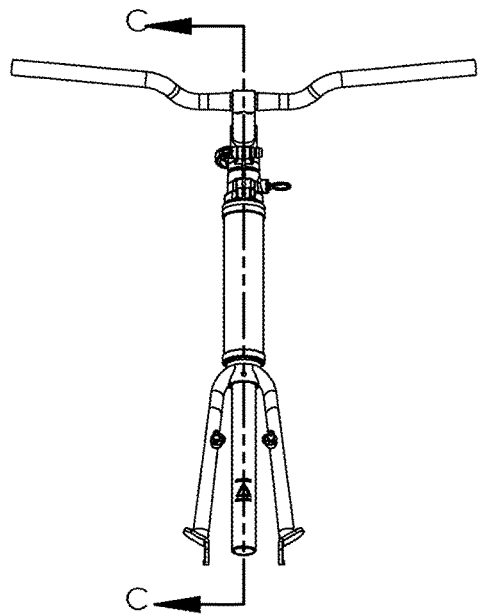
FIG. 2D is a front elevation view of the steering column of FIG. 2A which shows the steering column in a stowed position.
Figure 2E:
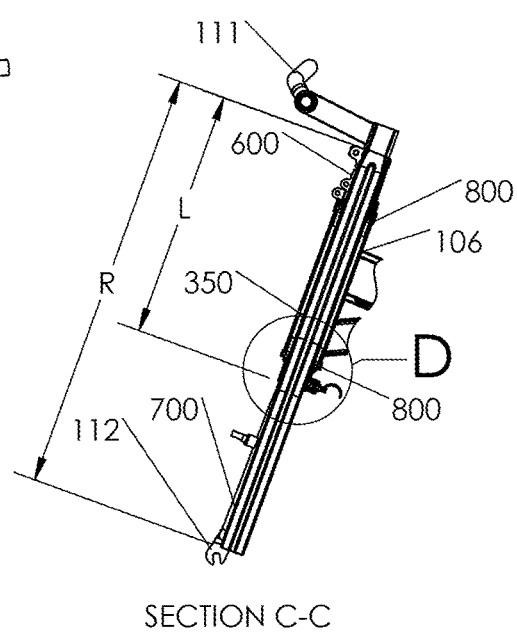
FIG. 2E is a section view of the steering column of FIG. 2D taken along line C-C.

Referring now to FIGS. 2A-2F, one embodiment of a stowable steering column 500 will now be described in more detail. This embodiment of a stowable steering column 500 includes a steering tube 700 that is comprised of a single long tube and a base 600. The length R of the steering tube 700 in this embodiment exceeds the length L of the fork steerer tube 350 and base 600. The base 600 is coupled to the top of a fork steerer tube 350. The coupling can take place through a variety of mechanisms as are known in the art. In this embodiment the base 600 is clamped to the fork steerer tube 350. The steering tube 700 is slidably received within the base 600 and the fork steerer tube 350. A handlebar assembly 111 is connected to an upper terminal end of the steering tube 700. The steering tube 700 can be locked into different axial positions relative to the base 600 and fork steerer tube 350 to facilitate different handle bar heights for riding as is depicted in FIGS. 2A & 2B. Alternatively, after detaching the front wheel 107 from the forks 112, the steering tube 700 can be slid downwards so that the handlebar assembly 111 approaches the base 600 and the lower portion of the steering tube 700 is stowed within the fork 112 for transport or storage as is depicted in FIGS. 2D & 2E.

Figure 5A:
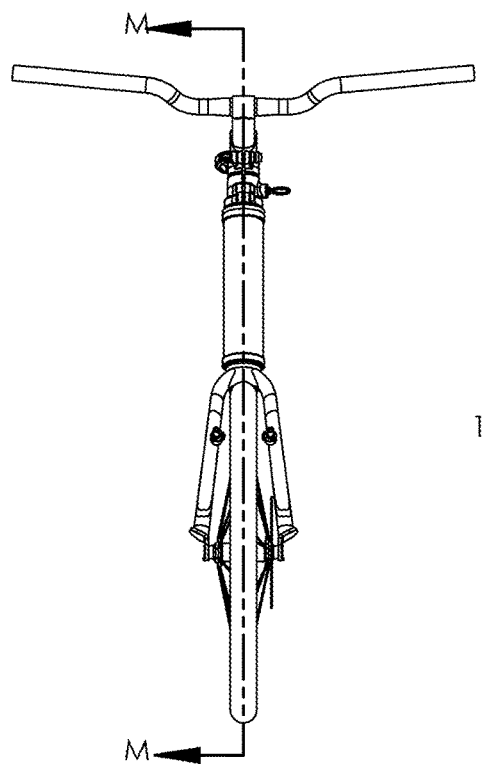
FIG. 5A is a front elevation view of another embodiment of a stowable steering column which shows the steering column in a stowed position.
Figure 5B:
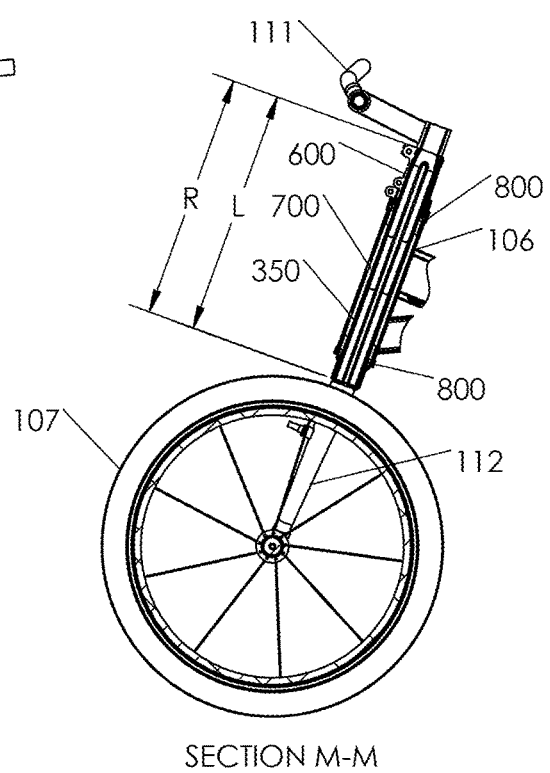
FIG. 5B is a section view of the steering column of FIG. 5A taken along line M-M.

An alternative embodiment of a stowable steering column 500 is depicted in FIGS. 5A & 5B. In this embodiment, the length R of the steering tube 700 is at least 300 mm and is equal to or shorter than the length L of the fork steerer tube 350 and base 600. In this embodiment, there is no need to remove the front wheel 107 before stowing the stowable steering column 500 because the steering tube 700 when slid downwards into the stowed position will not extend below the bottom of the fork steerer tube 350.

To facilitate handling the elliptical cycle while the stowable steering column 500 is in this stowed position, the steering tube 700 can be locked to the base 600, frame 106, fork 112, or another part of the elliptical cycle 100 by any number of mechanisms known in the art such as but not limited to screws, clamps, quick releases, pins, keys, detents, straps, buckles or any combination of these devices.

Figure 3A:
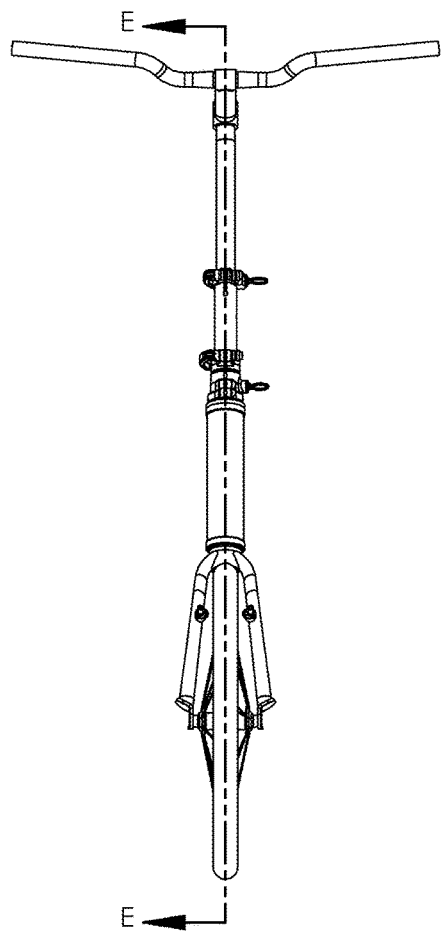
FIG. 3A is a front elevation view of another embodiment of a stowable steering column which shows the steering column in a riding position.
Figure 3B:
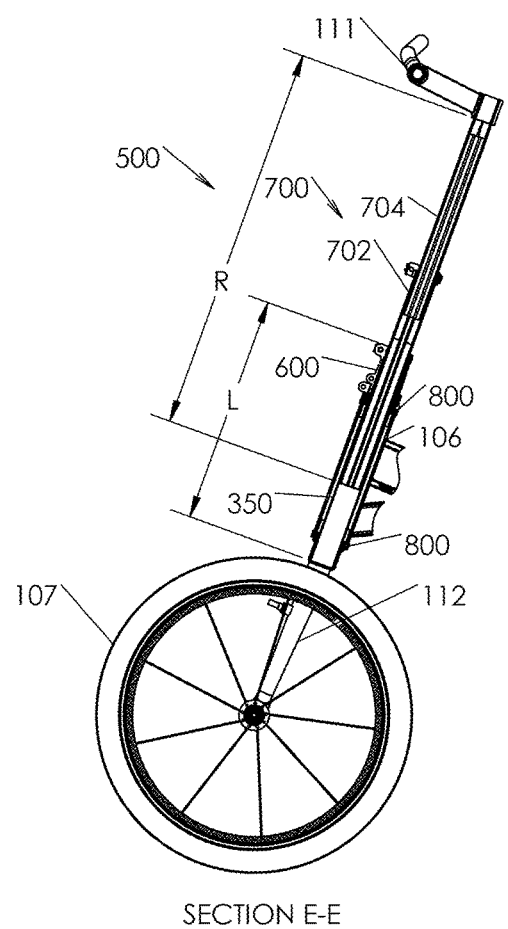
FIG. 3B is a section view of the steering column of FIG. 3A taken along line E-E.
Figure 3C:
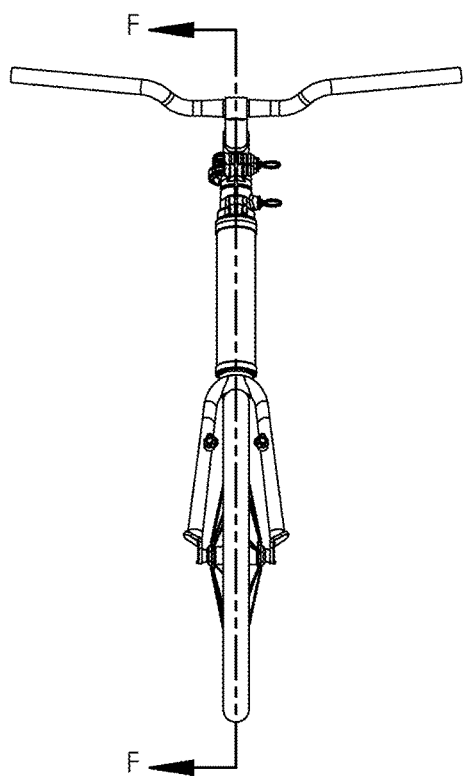
FIG. 3C is a front elevation view of the steering column of FIG. 3A which shows the steering column in a stowed position.
Figure 3D:
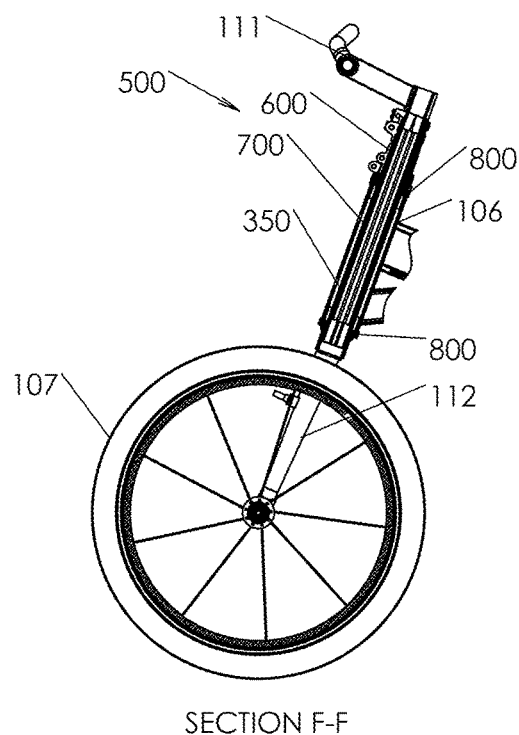
FIG. 3D is a section view of the steering column of FIG. 3C taken along line F-F.
Figure 6A:
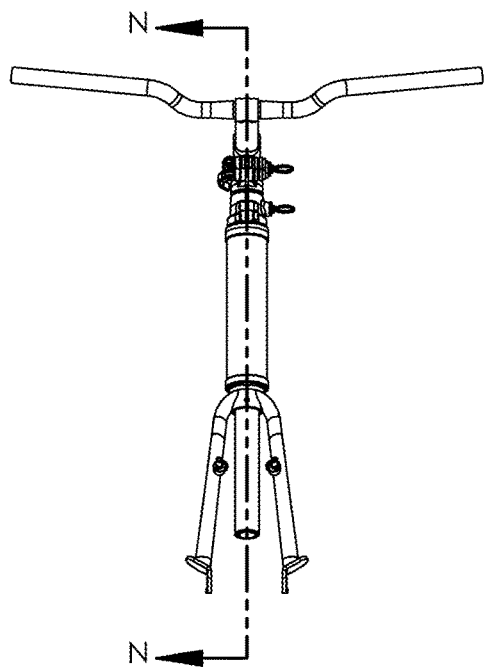
FIG. 6A is a front elevation view of another embodiment of a stowable steering column which shows the steering column in a stowed position.
Figure 6B:
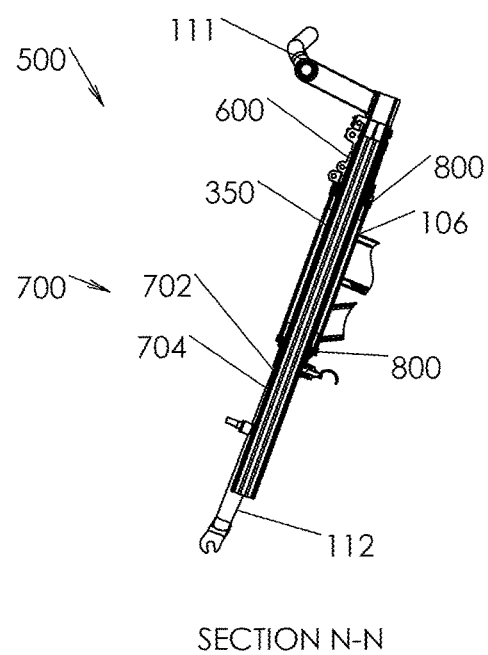
FIG. 6B is a section view of the steering column of FIG. 6A taken along line N-N.

FIGS. 3A-3D depict another embodiment of the stowable steering column. This embodiment is very similar to the previous embodiment, except the steering tube 700 is an assembly comprised of a series of two or more tubes 702, 704 that can telescopically extend and collapse. FIGS. 3A & 3B show the steering column 500 in the riding position. In the riding position, the two or more telescopic tubes can have a reach R from a top of the fork steerer tube 350 to the handlebar assembly 111 that exceeds the longitudinal length L of the fork steerer tube 350 and the base 600. FIGS. 3C & 3D show the steering column 500 stowed for transport and storage. In this embodiment, the front wheel 107 does not need to be removed to stow the steering column 500. An alternative embodiment of the stowable steering column with telescoping tubes is depicted in FIGS. 6A & 6B. In this embodiment, the telescopic tubes, 702, 704 extend below the fork steerer tube 350 when the steering column 500 is stowed for storage and transport.

On these and other embodiments, the steering tube 700 may be locked into different positions relative to the base 600 and fork steerer tube 350 using various mechanical devices known in the art such as but not limited to screws, clamps, quick releases, pins, keys, detents, straps, buckles, or any combination of these devices. The steering tube 700 may also have one or more features including, but not limited to, protrusions, grooves, indents, apertures or markings which aid in the repeatable setting and securing of the handle bar height. Similarly, the base 600 may be secured to the fork steerer tube 350 using various mechanical devices known in the art including, but not limited to, screws, clamps, quick releases, pins, keys, detents or any combination of such devices. In some embodiments, the base 600 can axially capture the fork steerer tube 350 relative to the frame 106 and headset bearings 800 while still allowing for relative rotation of the parts about the headset bearings 800. In some embodiments, the base 600 can also provide a means for adjusting the axial preload on the headset bearings 800.

Figure 2F:
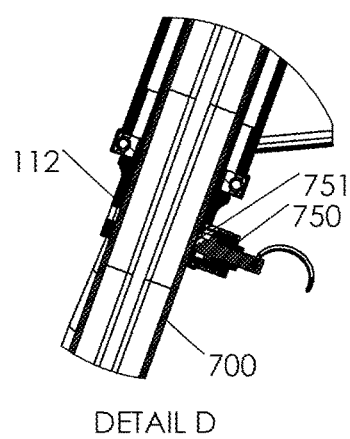
FIG. 2F is a detail view of area D of the steering column of FIG. 2E.

Stowable steering columns that require the front wheel 107 to be removed before stowing the steering column 500, such as the embodiment seen in FIGS. 2A-2F, may also include one or more safety interlock features to reduce the likelihood of the steering tube 700 accidently passing through the end of the fork steerer tube 350 and contacting the front wheel 107 while the vehicle is being ridden. FIG. 2C shows one embodiment of a safety interlock feature. This embodiment includes a pin assembly 750 rigidly attached to the fork 112 where the pin 751 is spring loaded inward preventing the steering tube 700 from being able to exit the fork steerer tube 350 and contact the front wheel 107 inadvertently. FIG. 2F shows that pulling the pin 751 outward allows the steering tube 700 to pass through the lower end of the fork steerer tube 350 into the stowed position.

Figure 4A:
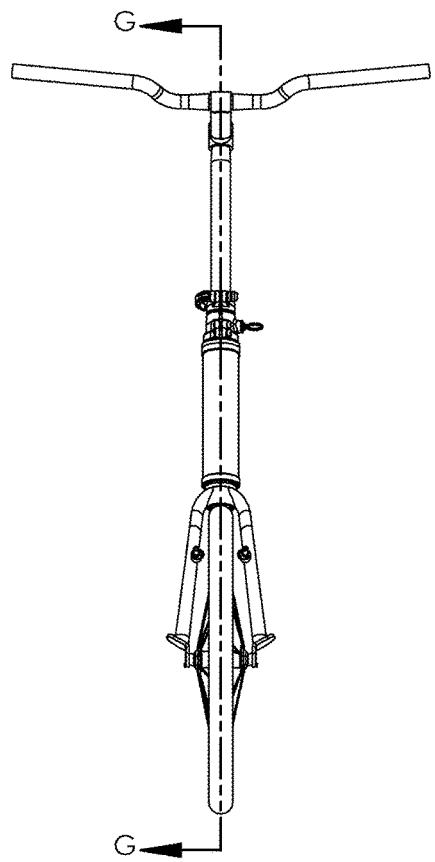
FIG. 4A is a front elevation view of another embodiment of a stowable steering column which shows the steering column in a riding position.
Figure 4B:
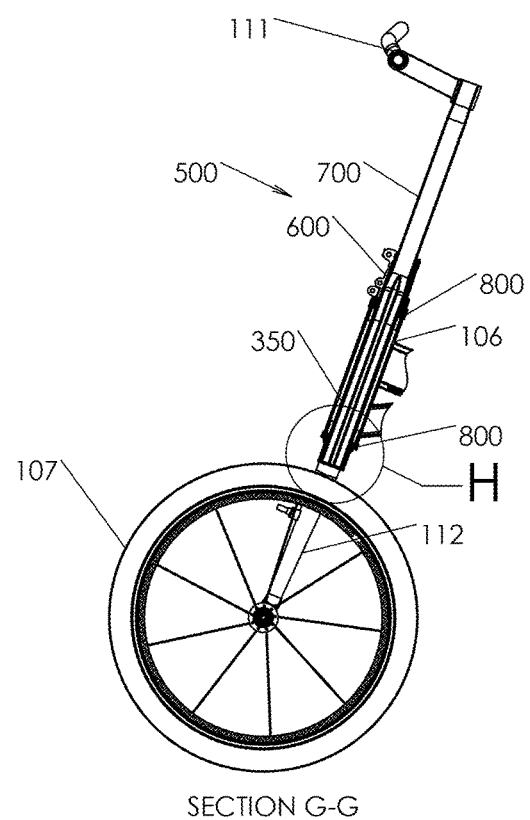
FIG. 4B is a section view of the steering column of FIG. 4A taken along line G-G.
Figure 4C:
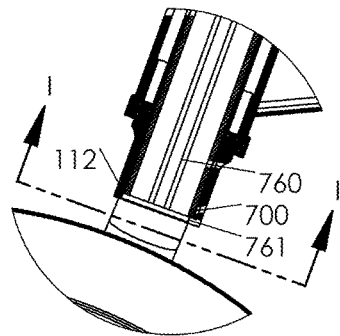
FIG. 4C is a detail view of area H of the steering column of FIG. 4B.
Figure 4D:
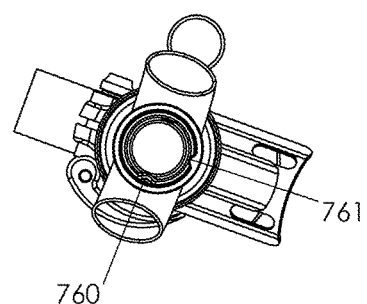
FIG. 4D is a section view of the steering column of FIG. 4C taken along line I-I.
Figure 4E:
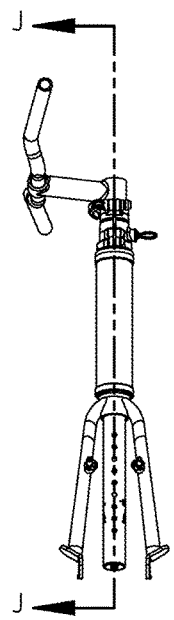
FIG. 4E is a front elevation view of the steering column of FIG. 4A which shows the steering column in a stowed position.
Figure 4F:
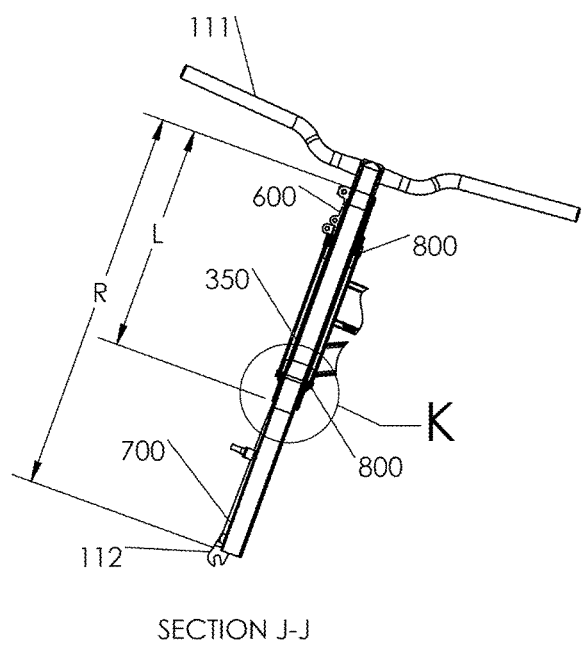
FIG. 4F is a section view of the steering column of FIG. 4E taken along line J-J.
Figure 4G:
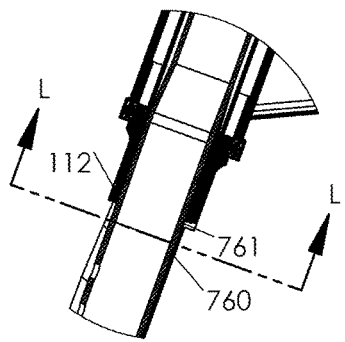
FIG. 4G is a detail view of area K of the steering column of FIG. 4F.
Figure 4H:
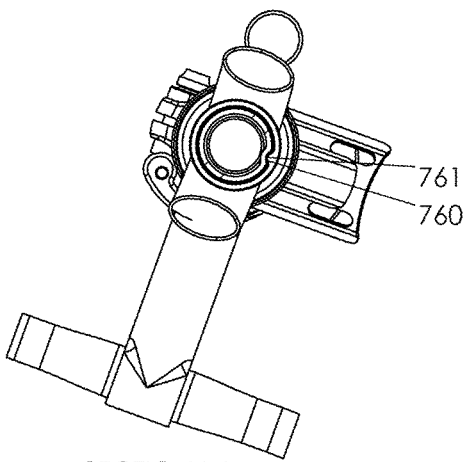
FIG. 4H is a section view of the steering column of FIG. 4G taken along line L-L.

FIGS. 4A-4H show another embodiment of a safety interlock feature for a stowable steering column that requires the front wheel 107 to be removed to stow the steering column 500. FIGS. 4A & 4B show the steering column 500 in a riding position. FIGS. 4E & 4F show the steering column 500 in a stowed position. FIGS. 4C, 4D, 4G & 4H are detailed depictions of this embodiment of a safety interlock feature. In this embodiment, there is a protrusion feature 761 rigidly attached to the fork 112 that engages a groove feature 760 which is longitudinally oriented on the steering tube 700. In this embodiment, to move the steering column 500 from a riding position to a stowed position, the steering tube 700 and handlebars 111 must be rotated 90 degrees in order to allow the protrusion feature 761 to align with and engage the groove feature 760 in the steering tube 700. Unless the protrusion feature 761 is aligned with and engages the groove feature 760, the steering tube 700 cannot pass through the fork steerer tube 350 and contact the front wheel 107. This 90-degree rotation takes the steering column 500 out of the riding position and prevents the steering tube 700 from passing through the fork steerer tube 350 inadvertently and contacting the front wheel 107 during riding. FIG. 4D shows a detailed section view about line I-I of this embodiment of a safety interlock feature in the riding position. Note that in the riding position, the protrusion feature 761 and the groove feature 760 of the steering tube 700 are misaligned by 90 degrees preventing the steering tube 700 from being able to exit the fork steerer 350 and contact the front wheel 107. FIG. 4H shows a detailed section view about line L-L of this embodiment of a safety interlock feature in the stowed position. Note that in the stowed position, the protrusion feature 761 and the groove feature 760 of the steering tube 700 are aligned, allowing the steering tube 700 to exit the fork steerer tube 350 into the stowed position once the front wheel 107 is removed.

The aforementioned embodiments of safety interlock features are only exemplary. Other embodiments may be implemented using various mechanical devices known in the art including, but not limited to, screws, clamps, quick releases, pins, keys, detents or any combination of these devices used on their own or in conjunction with mating features on an element of the vehicle, for example, the steering tube 700, the fork 112, the base 600, the fork steerer tube 350, or on an interface between two or more vehicle elements.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. For example, the elliptical cycle disclosed herein has a generally elliptical or ovate foot path where the forward end of the horizontal axis of the ellipse or oval is above the rearward end of the horizontal axis of the ellipse or oval relative to the ground. Other embodiments of an elliptical cycle employing a stowable steering column could be configured so that the foot path has the rearward end of the horizontal axis of the ellipse or oval situated equal with or above the forward end. Such embodiments, and others, are included within the scope of the invention.

Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Similarly, while the invention is described in terms of embodiments for an elliptical cycle, it should be understood that the various features and functionality can be applied to a wide range of vehicles, including, but not limited to, conventional pedal and crank bicycles, stand-up cycles, recumbent bicycles, folding bicycles, electric bicycles, adult scooters, kids scooters, electric scooters, human-powered vehicles, pedal-driven watercraft, and other similar vehicles. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the terms "ovate" and "elliptical" are intended to broadly include the family of closed shapes that are not a circle but could be described as "tear-drop", "football", "oval", "pear", "amoeba", "humped", etc. shapes that the foot platforms of a human-powered device could trace through a complete pedal stroke and, consequently, these terms are not intended to be limited to mathematical or other exacting definitions of "elliptical", "ellipse", or "oval"; the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A stowable steering column for a vehicle, comprising:
a fork steerer tube including a fork;
a base coupled to the fork steerer tube;
a steering tube slidably received within the base and the fork steerer tube, the steering tube including an upper terminal end and a lower portion;
a handlebar assembly coupled to the upper terminal end of the steering tube;
wherein the maximum effective length of the steering tube is greater than the effective length of the fork steerer tube and base and the steering tube is slidable into different axial positions relative to the base and fork steerer tube to facilitate different handle bar heights for riding and the steering tube is slidable downwards so that the handlebar assembly approaches the base and substantially all of the steering tube is at least one of stowed within and below the fork steerer tube for at least one of transport and storage.

2. The stowable steering column for a cycle of claim 1, wherein the vehicle is at least one of an elliptical cycle and a stand-up cycle.

3. The stowable steering column for a cycle of claim 1, wherein the steering tube includes at least one feature to aid in the repeatable setting and securing of the handle bar height.

4. The stowable steering column for a cycle of claim 1, further including one or more safety interlock features to prevent the steering tube from accidently passing through a lower end of the fork steerer tube.

5. The stowable steering column for a cycle of claim 4, wherein the one or more safety interlock features includes a pin assembly coupled to the fork steerer tube, the pin assembly including a spring loaded pin that is spring loaded inward to prevent the steering tube from accidently passing through the lower end of the fork steerer tube and is pullable outward to allow the steering tube to pass through the lower end of the fork steerer tube into at least one of transport and storage position.

6. The stowable steering column for a cycle of claim 4, wherein the one or more safety interlock features includes a protrusion feature attached to the fork steerer tube and a groove feature which is longitudinally oriented on the steering tube and engaged by the protrusion feature, wherein the steering tube is rotated a predetermined angular amount in order to allow the protrusion feature to align with and engage the groove feature in the steering tube and the steering tube to pass through the fork steerer tube.

7. A method of using the stowable steering column of claim 1, comprising:
sliding the steering tube downwards so that the handlebar assembly approaches the base and the lower portion of the steering tube is stowed within the fork beneath the fork steerer tube for at least one of transport and storage.

8. The method of claim 7, wherein the stowable steering column includes one or more safety interlock features to prevent the steering tube from accidently passing through a lower end of the fork steerer tube, the one or more safety interlock features including a pin assembly coupled to the fork steerer tube, the pin assembly including a spring loaded pin that is spring loaded inward to prevent the steering tube from accidently passing through the lower end of the fork steerer tube and is pullable outward to allow the steering tube to pass through the lower end of the fork steerer tube into at least one of transport and storage position, and the method further comprising pulling the spring loaded pin outward and sliding the steering tube downwards so that the handlebar assembly approaches the base and the lower portion of the steering tube is stowed within the fork beneath the fork steerer tube for at least one of transport and storage.

9. The method of claim 7, wherein the stowable steering column includes one or more safety interlock features to prevent the steering tube from accidently passing through a lower end of the fork steerer tube, the one or more safety interlock features including a protrusion feature attached to the fork steerer tube and a groove feature which is longitudinally oriented on the steering tube and engaged by the protrusion feature, and the method further comprising rotating the steering tube a predetermined angular amount in order to allow the protrusion feature to align with and engage the groove feature in the steering tube and sliding the steering tube downwards, with the protrusion feature aligned with and engaged with the groove feature, so that the handlebar assembly approaches the base and the lower portion of the steering tube is stowed within the fork beneath the fork steerer tube for at least one of transport and storage.

* * * * *